United States Patent
Svitelskyi et al.

(10) Patent No.: US 12,448,114 B2
(45) Date of Patent: Oct. 21, 2025

(54) AUTOPILOT-BASED AIRCRAFT RECOVERY SYSTEM

(71) Applicant: THE BOEING COMPANY, Arlington, VA (US)

(72) Inventors: Rostyslav Svitelskyi, Shoreline, WA (US); Sherwin Chunshek Li, Edmonds, WA (US); Brian Kenyon Rupnik, Lake Stevens, WA (US)

(73) Assignee: THE BOEING COMPANY, Arlington, VA (US)

( * ) Notice: Subject to any disclaimer, the term of this patent is extended or adjusted under 35 U.S.C. 154(b) by 159 days.

(21) Appl. No.: 18/166,302

(22) Filed: Feb. 8, 2023

(65) Prior Publication Data

US 2024/0262491 A1   Aug. 8, 2024

(51) Int. Cl.
*B64C 13/18* (2006.01)
*B64C 13/04* (2006.01)
*B64C 13/22* (2006.01)
*B64D 45/00* (2006.01)

(52) U.S. Cl.
CPC ............ *B64C 13/18* (2013.01); *B64C 13/042* (2018.01); *B64C 13/22* (2013.01); *B64D 45/00* (2013.01)

(58) Field of Classification Search
CPC ....... B64C 13/18; B64C 13/042; B64C 13/22; B64D 45/00
See application file for complete search history.

(56) References Cited

U.S. PATENT DOCUMENTS 5,868,359 A * 2/1999 Cartmell .............. G05D 1/0077 701/4
2007/0244639 A1 * 10/2007 Butterworth ......... G05D 1/0206 701/431
2012/0022723 A1 * 1/2012 Botargues ............ G05D 1/0055 701/4
2017/0008613 A1 * 1/2017 Turpin .................. G05D 1/0833
2018/0079519 A1 * 3/2018 Hedrick ............... G07C 5/0816
2022/0371722 A1 * 11/2022 Claffy ................ B64C 13/0421

OTHER PUBLICATIONS

Extended European Search Report for application No. 23217151.2 dated May 15, 2024, pp. 1-6.
Garmin, Autonomi Autonomous Safety-Enhancing Technologies, Garmin Autonomi Autonomous Flight Solutions, https://discover.garmin.com/en-US/autonomi/, retrieved Dec. 2, 2022, pp. 1-10.
Thurber, Matt "Dassault Adds More Smarts to Falcon Autothrottles," Avionics, Feb. 1, 2021, https://www.ainonline.com/aviation-news/business-aviation/2021-02-01/dassault-adds-more-smarts-falcon-autothrottles, pp. 1-12.
Communication pursuant to Article 94(3) EPC for application No. 23217151.2 dated Jul. 4, 2025, pp. 1-3.

* cited by examiner

*Primary Examiner* — Seth A Silverman
(74) *Attorney, Agent, or Firm* — Moore IP Law

(57) ABSTRACT

An aircraft includes an autopilot system including one or more processors. The one or more processors are configured to, in response to selection of an autopilot activation button during flight of the aircraft while the aircraft is operating in a first condition, apply first control laws to automatically control the flight of the aircraft. The one or more processors are further configured to, in response to selection of the autopilot activation button while the aircraft is operating in a second condition, apply second control laws to automatically control the flight of the aircraft, where the second control laws are different from the first control laws.

20 Claims, 10 Drawing Sheets

AUTOPILOT-BASED AIRCRAFT RECOVERY SYSTEM

FIELD OF THE DISCLOSURE

The present disclosure is generally related to an aircraft recovery system.

BACKGROUND

As a result of extensive research and improvement, commercial air travel is one of the safest ways to travel. A great deal of research has been directed to improving the reliability of the aircraft itself. Additional research, as well as extensive training, has been directed to improving the performance of pilots and other aircraft crew members. Alongside such improvements, computers and automation systems have been developed to improve the situational awareness of aircraft crew members and to simplify flight deck operations, each of which further improve safe operation of commercial aircraft.

Nevertheless, with the large number of flight hours logged each year around the world, loss-of-control situations occasionally arise. Efforts to reduce or eliminate these situations benefit the public and airlines by improving the reliability of air travel.

SUMMARY

According to a particular aspect, an aircraft includes an autopilot system including one or more processors. The one or more processors are configured to, in response to selection of an autopilot activation button during flight of the aircraft while the aircraft is operating in a first condition, apply first control laws to automatically control the flight of the aircraft. The one or more processors are further configured to, in response to selection of the autopilot activation button while the aircraft is operating in a second condition, apply second control laws to automatically control the flight of the aircraft, where the second control laws are different from the first control laws.

According to a particular aspect, a method includes detecting selection of an autopilot activation button of an aircraft during a flight of the aircraft. The method also includes determining, responsive to the selection of the autopilot activation button, a flight condition of the aircraft. The flight condition is indicative of whether the aircraft is operating in stable and trimmed flight. The method further includes selectively applying, by an autopilot system and based on the flight condition, first control laws or second control laws to automatically control the flight of the aircraft, where the second control laws are different from the first control laws.

According to a particular aspect, a non-transitory computer-readable medium stores instructions that are executable by one or more processors to cause the one or more processors to, based on selection of an autopilot activation button of an aircraft during a flight of the aircraft, determine a flight condition of the aircraft. The flight condition is indicative of whether the aircraft is operating in stable and trimmed flight. The instructions further cause the one or more processors to engage an autopilot system to selectively apply, based on the flight condition, first control laws or second control laws to automatically control the flight of the aircraft, where the second control laws are different from the first control laws.

The features, functions, and advantages described herein can be achieved independently in various implementations or may be combined in yet other implementations, further details of which can be found with reference to the following description and drawings.

DETAILED DESCRIPTION

Figure 1:
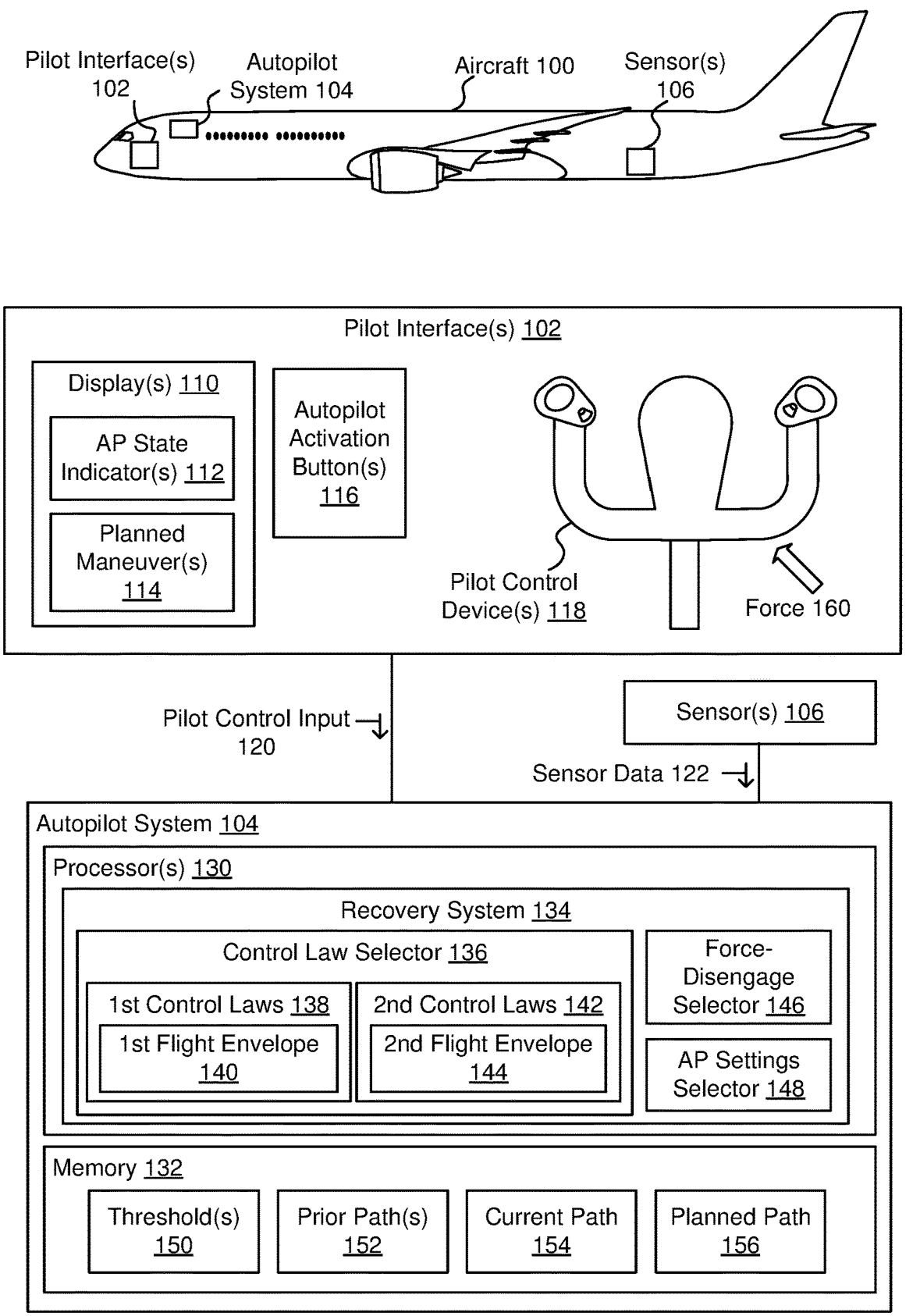
FIG. 1 is a diagram that illustrates an aircraft that includes an autopilot system with a recovery system according to a particular aspect.

According to particular aspects disclosed herein, an aircraft includes an upset recovery system that is configured to substantially automate recovery from an upset condition (e.g., an unstable flight condition, an untrimmed flight condition, or both). In a particular implementation, the upset recovery system is integrated within an autopilot system of the aircraft. For example, the upset recovery system can include software executed by one or more processors of the autopilot system. By integrating the upset recovery system into the autopilot system, the upset recovery system can have access to data and flight control systems needed to recover from an upset condition. As a result, little, if any, mechanical modification of the aircraft is needed. Additionally, integration with the autopilot system enables use of the upset recovery system onboard any aircraft with an autopilot system, which may include fly-by-wire and non-fly-by-wire aircraft.

In a particular aspect, the upset recovery system is activated by the same pilot input that is used to activate the autopilot system (typically a button or similar input device). Due to years of training, pilots already associate the autopilot system with reduced workload; thus, activating the upset recovery system using the same pilot input reduces pilot mental load in a potentially stressful circumstance.

It is worth noting that conventional autopilot systems are configured to engage during stable flight and cannot be activated during upset conditions. Rather, conventional autopilot systems are configured to maintain specified flight conditions, such as a specified lateral path, a specified vertical path, and/or a specified speed.

In contrast, the upset recovery system is configured to, starting from whatever flight condition is present when the upset recovery system is activated, return the aircraft to stable, straight, and level flight. The particular vertical path, lateral path, and speed targeted by the upset control system will depend on the upset condition and the specific operations performed for upset recovery and does not necessarily conform to any previously specified path or speed. Thus, one technical advantage of the disclosed upset recovery system is that the upset recovery system can be engaged at any time, from any aircraft flight configuration, with any flight controls settings, at any location, and in any weather condition. By automating upset recovery operations, the upset recovery system reduces the possibility of erroneous flight crew action due to loss of situational awareness.

In a particular implementation, the upset recovery system is configured to automatically recover from the upset condition, and then to switch into a normal autopilot mode. The particular normal autopilot mode selected, as well as the settings for the normal autopilot mode (e.g., planned flight path), are selected by the upset recovery system and depend on what operations the upset recovery system performed to recover from the upset condition. For example, if recovery from the upset condition is relatively minor, the upset recovery system attempts to return to a prior flight path. If the upset condition requires more severe maneuvering, the upset recovery system sets the autopilot system to continue along whatever flight path the upset recovery system achieved straight and level flight on, if that flight path is safe. If the flight path at which straight and level flight was achieved is deemed unsafe (e.g., too low), the upset recovery system specifies a safe flight path for the autopilot system to fly.

In some implementations, the upset recovery system is configured to automatically (e.g., independent of pilot input) initiate upset recovery operations. For example, the upset recovery system can automatically engage based on detecting conditions that far exceed a normal flight envelope of the aircraft. In such implementations, the upset recovery system remains engaged until or unless the flight crew takes over control. Thus, the upset recovery system is able to recover from conditions that the flight crew may not be aware of due to incapacitation, loss of situational awareness, some other type of situation, or combinations thereof.

In some implementations, while operating, the upset recovery system provides information about planned operations to the flight crew. For example, indicators can be added to information displays in the flight deck to alert the flight crew as to what actions the upset recovery system is planning to take to recover from the upset condition. Additionally, to the extent possible, the upset recovery system can balance performance, comfort, piloting technique, and stability to reduce discomfort to aircraft occupants and strain on aircraft components.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 4-6, multiple primary flight displays are illustrated and associated with reference numbers 450A, 450B, and 450C. When referring to a particular one of these primary flight displays, such as the primary flight display 450A, the distinguishing letter "A" is used. However, when referring to any arbitrary one of these primary flight displays or to these primary flight displays as a group, the reference number 450 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts an aircraft 100 that includes one or more displays (e.g., "display(s)" 110 in FIG. 1), which indicates that in some implementations the aircraft 100 includes a single display 110 and in other implementations the aircraft 100 includes multiple display(s) 110. For ease of reference herein, such features are generally introduced as "one or more" features, and are subsequently referred to in the singular or optional plural (as indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 illustrates an aircraft 100 that includes one or more pilot interface(s) 102, an autopilot system 104, and one or more sensors 106. FIG. 1 also includes block diagrams of examples of the pilot interface(s) 102 and the autopilot system 104. The autopilot system 104 is coupled to the pilot interface(s) 102 and to the sensor(s) 106. The autopilot system 104 includes one or more processors 130 and memory 132.

The pilot interface(s) 102, the autopilot system 104, and the sensor(s) 106 are each represented by individual blocks in FIG. 1 merely for simplicity of illustration, which should not be understood to indicate that each corresponds to a single line replaceable unit (LRU) of the aircraft 100. Rather, in various implementations, one or more of (e.g., each of) the pilot interface(s) 102, the autopilot system 104, and the sensor(s) 106 corresponds to more than one LRU of the aircraft 100. For example, the pilot interface(s) 102 may include a collection of displays, panels, inceptors, pedals, switches, knobs, buttons, or other devices disposed on a flight deck of the aircraft 100 to enable pilot control of the aircraft 100 and its various subsystems. To illustrate, in FIG. 1, the pilot interface(s) 102 include one or more display(s) 110, one or more autopilot activation buttons 116, and one or more pilot control devices 118 (illustrated in FIG. 1 as a yoke, but other configurations are also contemplated). As another example, the sensor(s) 106 can include integrated and/or discrete sensors distributed across the aircraft 100. As a further example, the autopilot system 104 can include components within various LRUs of the aircraft 100.

The autopilot system 104 includes one or more processors 130 and memory 132. In a particular aspect, the autopilot system 104 includes a recovery system 134 (also referred to herein as an "upset recovery system"). In the example illustrated in FIG. 1, the processor(s) 130 perform the operations of the recovery system 134 (e.g., by executing instructions from the memory 132); however, in other examples, the operations of the recovery system 134 or aspects thereof are performed by special purpose circuitry, such as application-specific integrated circuits, field-programmable gate arrays, discrete logic circuits, etc.

In the example illustrated in FIG. 1, the recovery system 134 includes a control law selector 136, a force-disengage selector 146, and an autopilot (AP) settings selector 148. The control law selector 136 is configured to select between two or more sets of different control laws (e.g., first control laws 138 and second control laws 142, in the example illustrated in FIG. 1) based on an operating condition of the aircraft 100. The control law selector 136 selects between the different control laws when a pilot requests activation of the autopilot system 104 (e.g., via selection of the autopilot activation button(s) 116 during flight) or automatically based on detection of a particular operating condition of the aircraft 100. For example, the first control laws 138 are applied to automatically control the flight of the aircraft 100 when the control law selector 136 determines that the aircraft 100 is operating in a first condition (e.g., a normal flight condition), and the second control laws 142 are applied to automatically control the flight of the aircraft 100 when the control law selector 136 determines that the aircraft 100 is operating in a second condition (e.g., an upset flight condition, an untrimmed flight condition, or both). In a particular aspect, the control law selector 136 determines the operating condition of the aircraft 100 by comparing sensor data 122 from the sensor(s) 106 to one or more thresholds 150 in the memory 132.

In general, the first set of control laws 138 constrain operation of the aircraft 100 to a first flight envelope 140, and the second set of control laws 142 constrain operation of the aircraft 100 to a second flight envelope 144, where the second flight envelope 144 is different than the first flight envelope 140. For example, the first flight envelope 140 may include a first range of acceptable roll angles, and the second flight envelope 144 may include a second range of acceptable roll angles. In this example, the second range of acceptable roll angles generally includes a broader range of roll angles than the first range of acceptable roll angles. Additionally, or alternatively, the flight envelopes 140, 144 may include different ranges of acceptable pitch angles, different ranges of acceptable yaw angles, different ranges of acceptable airspeeds, different ranges of acceptable g-forces, or other ranges descriptive of operations of the aircraft 100. Thus, when the second control laws 142 are applied, the autopilot system 104 is configured to maneuver the aircraft 100 in ways that would be prohibited if the first control laws 138 were applied.

In particular implementations, the autopilot system 104 can be activated in various ways. For example, the autopilot system 104 can be activated manually (e.g., by selection of the autopilot activation button(s) 116) while the aircraft 100 is in a first operating condition, manually (e.g., by selection of the autopilot activation button(s) 116) while the aircraft 100 is in a second operating condition, and automatically (e.g., independent of selection of the autopilot activation button(s) 116) while the aircraft 100 is in a third operating condition. In this example, the first, second, and third operating conditions are mutually exclusive, and represent progressively greater deviations from normal flight conditions. For example, the first operating condition represents any condition within a range of normal flight conditions, where "normal flight conditions" is defined by the pilot, an owner or operator of the aircraft 100 (e.g., an airline), a manufacturer of the aircraft 100, an aircraft or flight oversight agency (e.g., the U.S. Federal Aviation Administration), or another oversight entity, and can vary from aircraft to aircraft and from flight to flight, based on weather or other ambient conditions, etc. As one illustrative and non-limiting example, the first operating condition corresponds to trimmed and stable flight, which may be indicated by: a range of airspeeds between a stall speed of the aircraft 100 and maximum speed of the aircraft 100 (either or both of which may be offset by a safety factor) and appropriate for a current flap setting; a pitch angle between about +25 degrees and −15 degrees; a bank angle less than 45 degrees; neutral flight control inputs neutral and aircraft trimmed out; and an absolute altitude greater than 100 feet.

In contrast, the second and third operating conditions represent conditions outside the range of normal flight conditions included in the first operating condition, and the third operating condition represents a larger deviation from the range of normal flight conditions than the second operating condition. The range of flight conditions included in the second operating conditions can be defined by the pilot, the owner or operator of the aircraft 100 (e.g., an airline), the manufacturer of the aircraft 100, the aircraft or flight oversight agency (e.g., the U.S. Federal Aviation Administration), or another oversight entity, and can vary from aircraft to aircraft and from flight to flight, based on weather or other ambient conditions, etc. Furthermore, the range of flight conditions included in the second operating conditions can be defined by the same individual or entity that defines the range of flight conditions included in the first operating conditions, or the first and second ranges of operating conditions can be defined by different individuals or entities. In some implementations, the range of flight conditions included in the third operating conditions is open ended (e.g., includes any operating condition that is not included in the first operating condition and is not included in the second operating condition). In other implementations, the third operating condition is closed ended and includes a specified range of flight conditions beyond the second operating conditions.

In some implementations, the sensor data 122 is continuously or periodically monitored during a flight (e.g., by the autopilot system 104 and/or other components of the aircraft 100) and is used to, among other things, determine whether the aircraft 100 is in the first operating condition, the second operating condition, or the third operating condition. In such implementations, the display(s) 110, in addition to providing information based on the sensor data 122, provide information about the state of the autopilot system 104. To illustrate, in FIG. 1, the display(s) 110 include one or more AP state indicator(s) 112. The AP state indicator(s) 112 may indicate which mode, if any, of the autopilot system 104 are engaged. In some implementations, the AP state indicator(s) 112 may also indicate whether the autopilot system 104 is armed and/or ready to engage. To illustrate, when the aircraft 100 is operating in the first operating condition the AP state indicator(s) 112 may indicate that a vertical navigation (VNAV) mode, a lateral navigation (LNAV) mode, or both, are engaged. When the aircraft 100 is in the second operating condition, the VNAV and LNAV modes are not available to engage; however, the AP state indicator(s) 112 may indicate to the pilot that the autopilot system 104 can be engaged in a recovery mode (e.g., using the second control laws 142). In some implementations, when the aircraft 100 is in the third operating condition, the autopilot system 104 automatically engages in the recovery mode (e.g., using the second control laws 142) and the AP state indicator(s) 112 advise the pilot that the recovery mode is engaged.

The autopilot system 104 (including the recovery system 134) can be disengaged by the pilot via the autopilot activation button(s) 116 or by providing pilot control input 120 via one of the pilot control device(s) 118, such as the yoke. However, since the recovery system 134 is configured to be activated (automatically or in response to pilot input) during an upset or untrimmed condition, it is expected that in some circumstances, the pilot control device(s) 118 may be displaced from a neutral position when the recovery system 134 engages. Accordingly, when the recovery system 134 engages, the force-disengage selector 146 sets a force-disengage threshold. The force-disengage threshold indicates a force 160 that, when applied by the pilot to the pilot control device(s) 118 as pilot control input 120, causes the autopilot system 104 to disengage. In a particular implementation, when the recovery system 134 is engaged, the force-disengage selector 146 sets the force-disengage threshold to a value greater than a value of the force-disengage threshold used by the autopilot system 104 when the recovery system 134 is not engaged (e.g., during non-recovery operation of the autopilot system 104). In some implementations, the force-disengage selector 146 reduces the force-disengage threshold over time after the recovery system 134 is engaged. For example, the force 160 required to exceed the force-disengage threshold is based, at least in part, on a time elapsed since the autopilot system 104 was automatically engaged or since the recovery system 134 was engaged. In some implementations, the force-disengage selector 146 determines the force-disengage threshold based, at least in part, on an operating condition of the aircraft 100. For example, the force-disengage threshold is higher when the operating condition of the aircraft 100 deviates further from the first operating condition and is lower when the operating condition of the aircraft 100 deviates less severely from the first operating condition.

Figure 4:
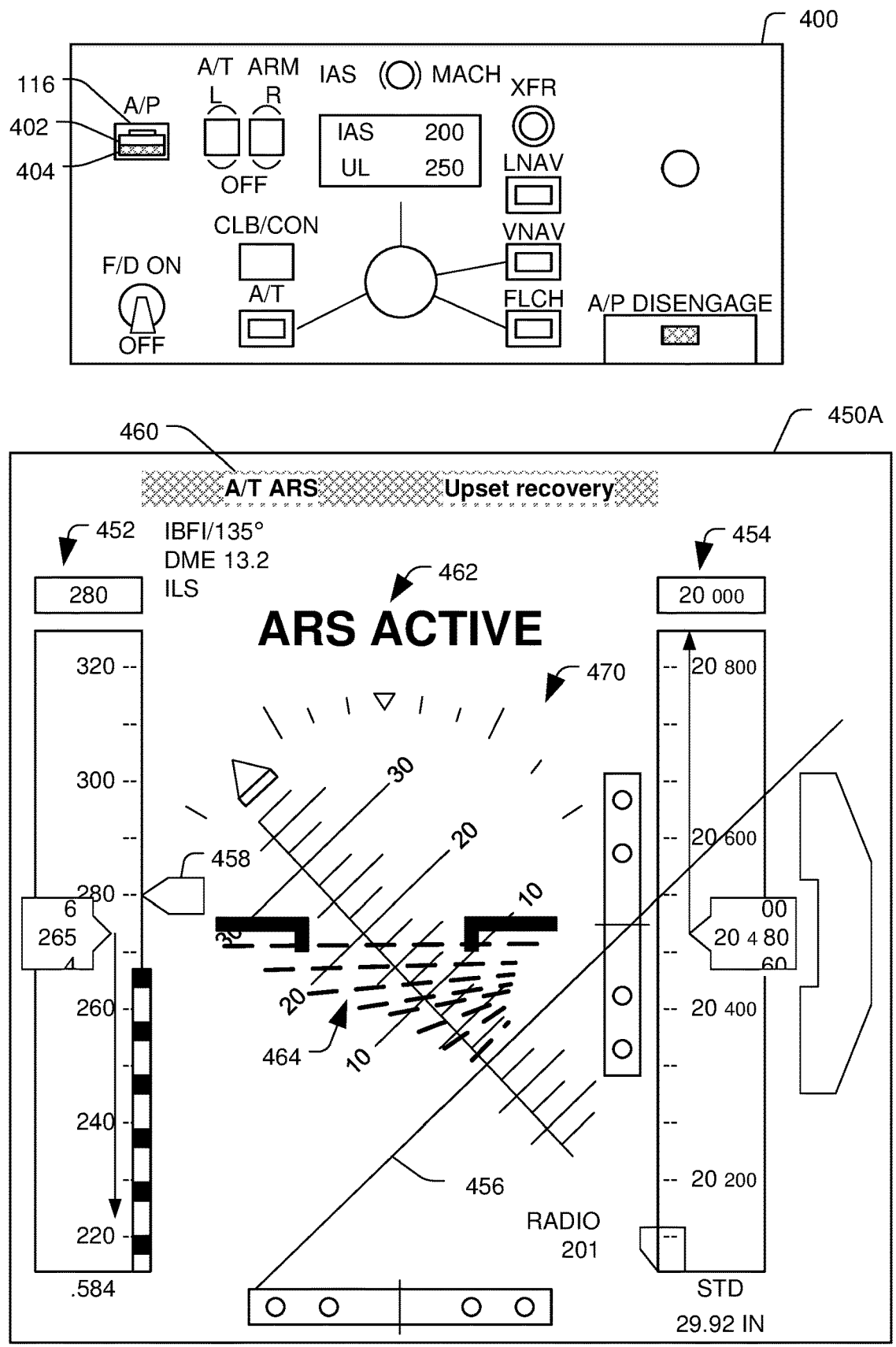
FIG. 4 illustrates examples of pilot interfaces of the aircraft of FIG. 1.
Figure 5:
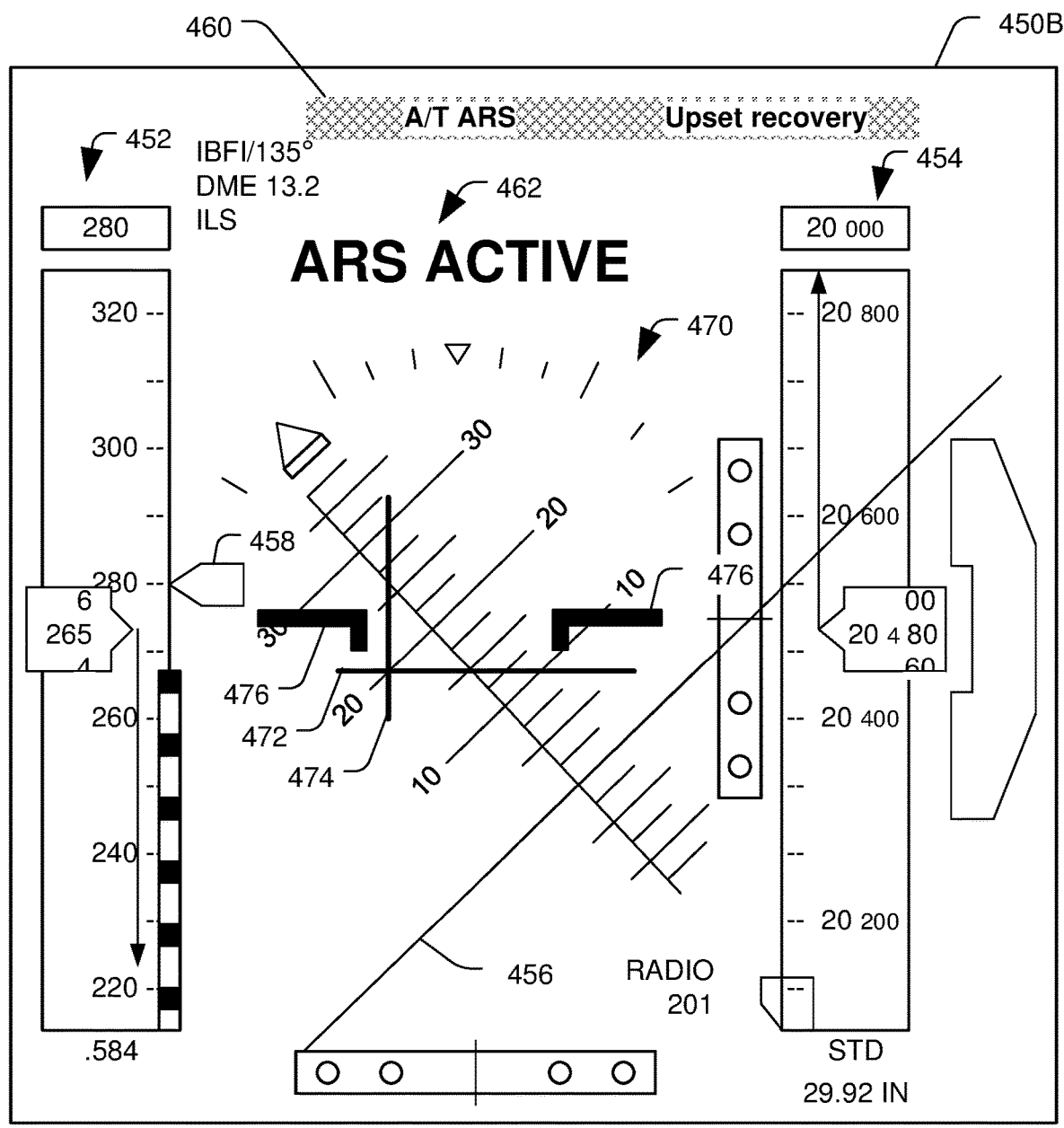
FIG. 5 illustrates another example of a pilot interface of the aircraft of FIG. 1.
Figure 6:
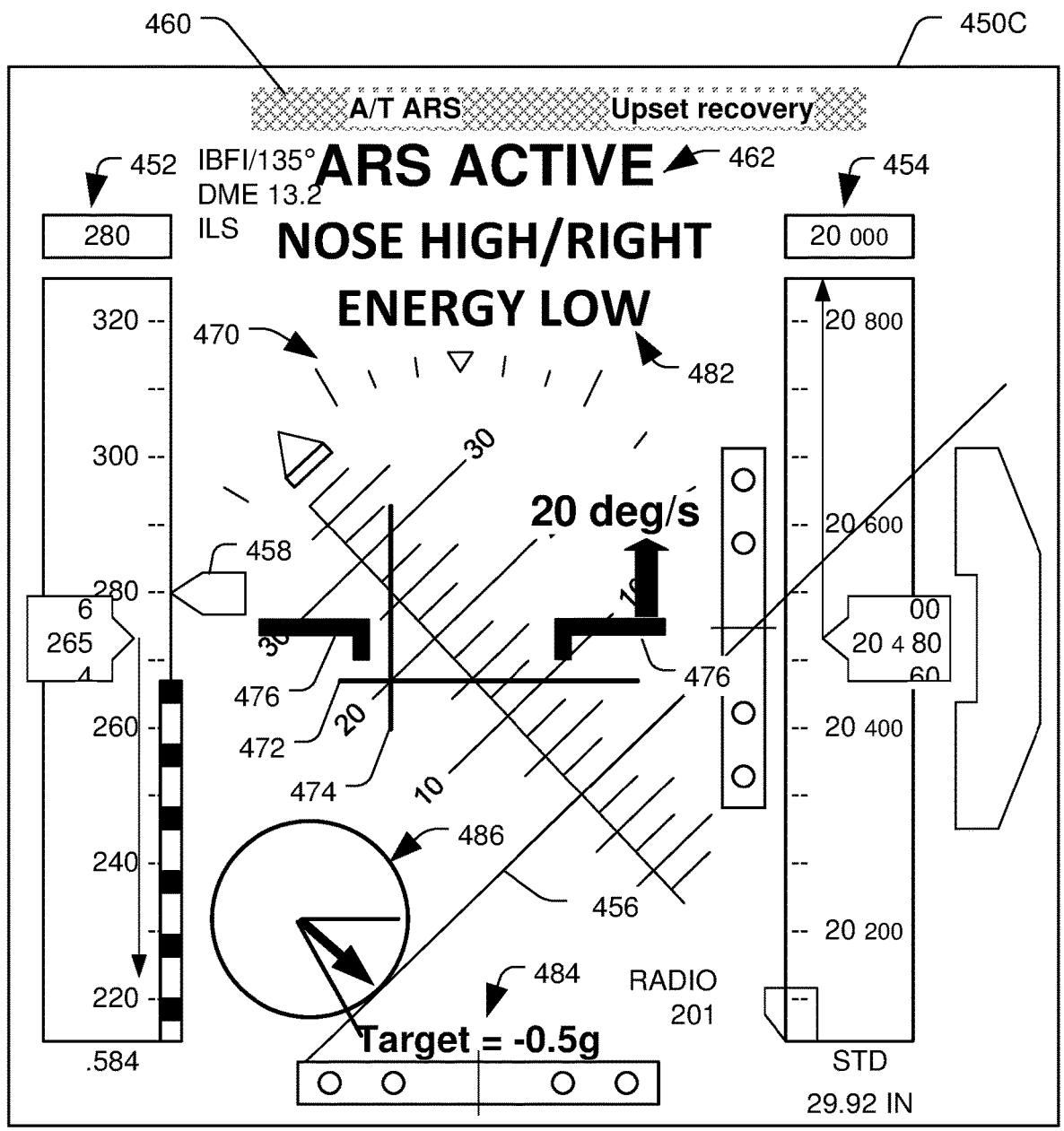
FIG. 6 illustrates another example of a pilot interface of the aircraft of FIG. 1.

While the recovery system 134 is engaged, the autopilot system 104 controls operation of the aircraft 100 and maneuvers the aircraft 100 to return to the first operating condition (e.g., to straight and level flight at a safe altitude). For example, the recovery system 134 of the autopilot system 104 uses constraints associated with the second control laws 142 and good piloting technique to maneuver the aircraft 100. In some implementations, when the recovery system 134 is engaged (e.g., while the second control laws 142 are applied), the autopilot system 104 provides information indicating one or more planned maneuver(s) 114 to the display(s) 110. For example, the display(s) 110 may include one or more pilot information displays, such as a primary flight display, and the autopilot system 104 may indicate in the pilot information displays that the recovery system 134 is engaged (e.g., that the autopilot system 104 is engaged in a state associated with the second control laws 142) and that the autopilot system 104 is planning to execute one or more specified maneuvers. FIGS. 4-6 illustrate examples of such a pilot information display.

In a particular aspect, after the recovery system 134 (e.g., the autopilot system 104 applying the second control laws 142) returns the aircraft 100 to straight and level flight, the recovery system 134 disengages, leaving the autopilot system 104 engaged and applying the first control laws 138. For example, while the second control laws 142 are applied, the AP settings selector 148 determines a planned path 156 for the autopilot system 104 to fly. The AP settings selector 148 determines the planned path 156 based on one or more prior path(s) 152 of the aircraft 100, a current path 154 of the aircraft 100, or both. The prior path(s) 152 include, for example, a prior setpoint of a flight parameter for a period prior to a disturbance that led to the aircraft operating in the second condition. To illustrate, the prior path(s) 152 may include one or more previously set waypoints, a prior LNAV setting, a prior VNAV setting, or any other flight parameter specifying a lateral path of the aircraft 100 or a vertical path of the aircraft 100 before the recovery system 134 was engaged.

In a particular implementation, the AP settings selector 148 determines an updated setpoint of a flight parameter based, at least in part, on the prior setpoint of the flight parameter. For example, the AP settings selector 148 performs a comparison of a current value of the flight parameter to the prior setpoint of the flight parameter. In this example, the updated setpoint is set equal to the prior setpoint when a result of the comparison satisfies one or more return-tosetpoint criteria (e.g., one or more of the threshold(s) 150). Further, in this example, the updated setpoint is set unequal to the prior setpoint when the result of the comparison fails to satisfy the one or more return-to-setpoint criteria. To illustrate, the return-to-setpoint criteria may be satisfied when the altitude at which the aircraft 100 will achieve straight and level flight (and thus apply the first control laws 138) is within a threshold 150 above or below the altitude setpoint prior to the recovery system 134 being engaged.

The flight parameter(s) considered by the AP settings selector 148 may include a vertical path of the aircraft 100, a lateral path of the aircraft 100, or both. For example, the AP settings selector 148 may compare a current vertical path to a planned vertical path of the aircraft 100, and at least one of the one or more return-to-setpoint criteria may be satisfied when the current vertical path of the aircraft deviates by less than a threshold amount from the prior setpoint of the planned vertical path. In this example, the updated setpoint is set equal to the prior setpoint further based on a result of the current vertical path satisfying a threshold (e.g., the current vertical path has an absolute altitude greater than a threshold). As another example, the AP settings selector 148 may compare a current lateral path to a previous planned lateral path of the aircraft, and at least one of the one or more return-to-setpoint criteria is satisfied when the current lateral path of the aircraft deviates by less than a threshold amount from the previous planned lateral path. In a particular implementation, when the updated setpoint is set unequal to the prior setpoint, the updated setpoint is set to establish straight and level flight of the aircraft along a safe lateral path and at a safe altitude.

During operation, the pilot of the aircraft 100 can engage the autopilot system 104 by selecting the autopilot activation button(s) 116. In a particular aspect, the autopilot system 104 can be engaged irrespective of the operating condition in which the aircraft 100 is flying. For example, while traditional autopilot systems cannot be engaged while an aircraft is untrimmed or in an upset condition, the autopilot system 104 disclosed herein can be engaged when the aircraft is untrimmed, in an upset condition, or both. If the aircraft 100 is in a trimmed and stable flight condition when the pilot selects the autopilot activation button(s) 116, the autopilot system 104 engages and applies the first control laws 138. If the aircraft 100 is in an untrimmed flight condition, an upset condition, or both, when the pilot selects the autopilot activation button(s) 116, the autopilot system 104 engages and applies the second control laws 142. Further, if the aircraft 100 enters a flight condition that deviates significantly (e.g., based on the threshold(s) 150) from the first flight envelope 140, the autopilot system 104 engages automatically, without pilot input, and applies the second control laws 142.

While the autopilot system 104 is engaged and applying the second control laws 142, the autopilot system 104 performs maneuvers to recover the aircraft 100 to straight and level flight. The autopilot system 104 provides pilot information displays via the display(s) 110 to inform the pilot of planned maneuver(s) 114 to return to straight and level flight. While the autopilot system 104 is engaged, the pilot can disengage the autopilot system 104 by application of a sufficient force 160 to one or more of the pilot control devices 118 (such as the yoke or a side stick). In some implementations, the amount of force required to disengage the autopilot system 104 (e.g., the force-disengage threshold) is fixed while the first control laws 138 are applied, and optionally varies when the second control laws 142 are applied. For example, when the second control laws 142 are applied, the force-disengage selector 146 can set the force-disengage threshold based on the current flight condition of the aircraft 100, a time elapsed since the second control laws 142 were engaged, or both.

While the second control laws 142 are being applied by the autopilot system 104, the AP settings selector 148 determines setpoints for one or more flight parameters to specify a planned path 156 for the autopilot system 104 to follow after the aircraft 100 has recovered to straight and level flight. The flight parameter(s) may correspond to flight parameters of a prior path 152 (e.g., lateral path and/or a vertical path that the aircraft 100 was following before the second control laws 142 were applied). Alternatively, if the flight path when the aircraft 100 achieves straight and level flight differs significantly (as determined based on the threshold(s) 150) from the prior path(s) 152, the AP settings selector 148 may set an arbitrary safe flight path as the planned path 156.

When the aircraft 100 has recovered to straight and level flight, the autopilot system 104 remains engaged but switches to applying the first control laws 138. In this post-recovery mode, the autopilot system 104 follows the planned path 156 selected by the AP settings selector 148. Thus, one technical advantage of the autopilot system 104 is that the autopilot system 104 mitigates the risk of loss-of-control inflight events by enabling automatic recovery from upset and/or untrimmed conditions. Another technical advantage is that, by integrating the recovery system 134 with the autopilot system 104, installation of the recovery system 134 is simplified and mental workload for pilots is reduced by reusing controls associated with the autopilot system 104 (the autopilot activation button(s) 116) to initiate automated recovery. Another technical advantage is that the recovery system 134 enables recovery from conditions that the flight crew may be unaware of (e.g., due to lack of situational awareness or incapacity).

While FIG. 1 illustrates two sets of control laws that correspond to two flight conditions, in other examples, the control law selector 136 selects between more than two sets of control laws for more than two flight conditions.

Although the control law selector 136, the force-disengage selector 146, and the AP settings selector 148 are depicted as separate components, in other implementations the described functionality of two or more of the control law selector 136, the force-disengage selector 146, and the AP settings selector 148 can be performed by a single component. In some implementations, each of the control law selector 136, the force-disengage selector 146, and the AP settings selector 148 can be represented in hardware, such as via an application-specific integrated circuit (ASIC) or a field-programmable gate array (FPGA), or the operations described with reference to the elements may be performed by a processor executing computer-readable instructions.

Figure 2:
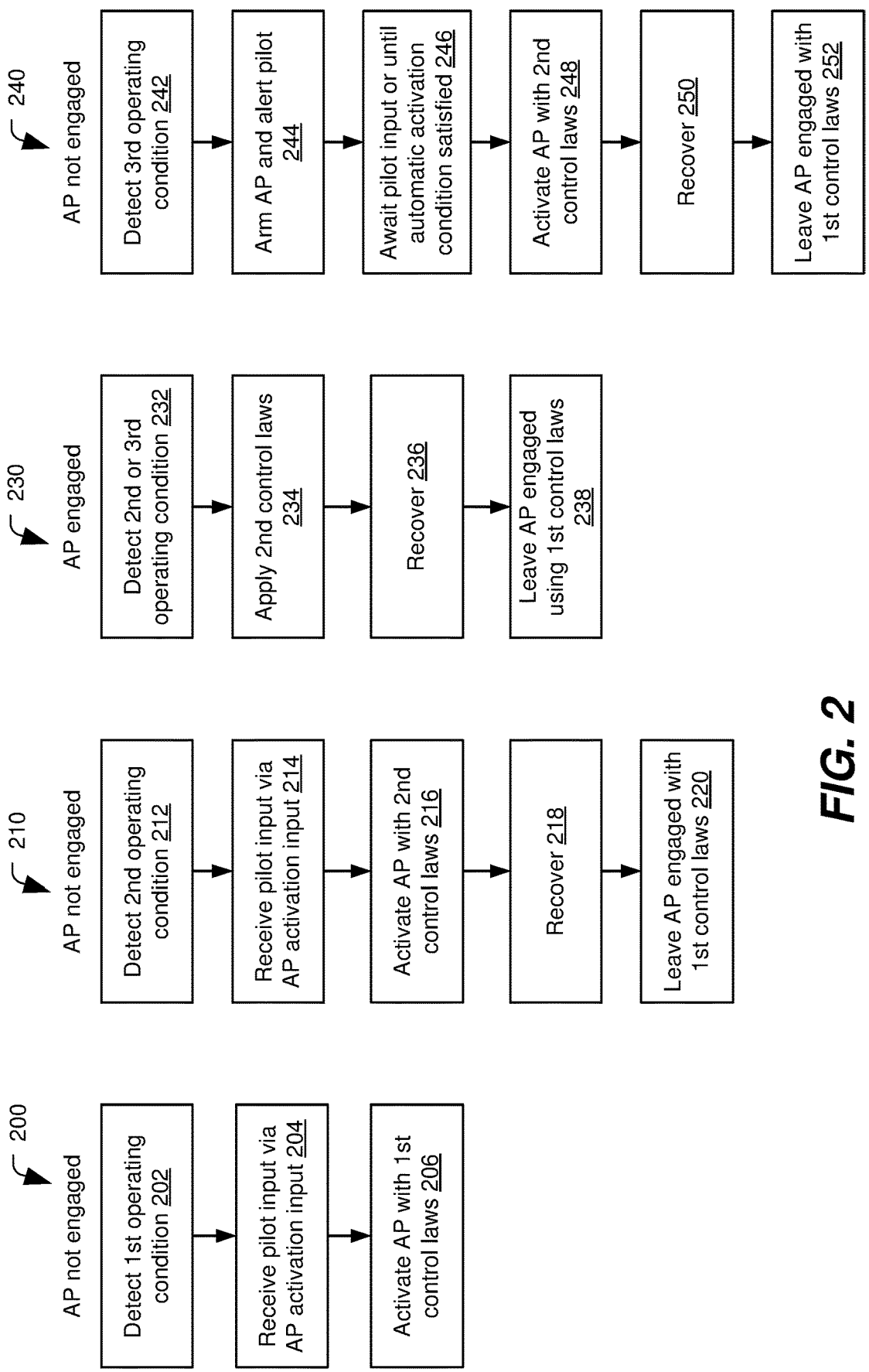
FIG. 2 illustrates flowcharts representing examples of operations of the autopilot system of FIG. 1 in various circumstances according to a particular aspect.

FIG. 2 illustrates flowcharts representing examples of operations of the autopilot system 104 of FIG. 1 in various circumstances according to a particular aspect. Text above each flowchart of FIG. 2 represents a state of the autopilot system 104 before the operations listed in the flowchart begin.

At block 202 of a first flowchart 200, a first operating condition (e.g., normal operation as described with reference to FIG. 1) of the aircraft 100 is detected while the autopilot system 104 is not engaged. At block 204, pilot input is received via an autopilot activation input, such as the autopilot activation button(s) 116 of FIG. 1. At block 206, in response to the pilot input, the autopilot system 104 is activated with the first control laws 138 of FIG. 1.

At block 212 of a second flowchart 210, a second operating condition (e.g., an upset condition, and untrimmed condition, or both, as described with reference to FIG. 1) of the aircraft 100 is detected while the autopilot system 104 is not engaged. At block 214, pilot input is received via an autopilot activation input, such as the autopilot activation button(s) 116 of FIG. 1. At block 216, in response to the pilot input, the autopilot system 104 is activated with the second control laws 142 of FIG. 1. At block 218, the autopilot system 104 performs maneuvers to recover the aircraft 100 to straight and level flight, and at block 220, the autopilot system 104 remains engaged with the first control laws 138.

At block 232 of a third flowchart 230, the second or third operating condition (as described with reference to FIG. 1) is detected while the autopilot system 104 is engaged (e.g., using the first control laws 138). At block 234, the autopilot system 104 switches control laws and applies the second control laws 142 of FIG. 1. At block 236, the autopilot system 104 performs maneuvers to recover the aircraft 100 to straight and level flight, and at block 238, the autopilot system 104 remains engaged and returns to use of the first control laws 138.

At block 242 of a fourth flowchart 240, the third operating condition (as described with reference to FIG. 1) is detected while the autopilot system 104 is not engaged. Optionally, at block 244, the autopilot system 104 is armed and the pilot is alerted that the autopilot system 104 is available (e.g., via the AP state indicator(s) 112 and/or other pilot information systems). Optionally, at block 246, the autopilot system 104 awaits pilot input or until an automatic activation condition is satisfied. If the pilot selects to activate the autopilot system 104 (e.g., via the autopilot activation button(s) 116) or the automatic activation condition is satisfied, the autopilot system is activated, at block 248, and applies the second control laws 142 of FIG. 1. At block 250, the autopilot system 104 performs maneuvers to recover the aircraft 100 to straight and level flight, and at block 252, the autopilot system 104 remains engaged and returns to use of the first control laws 138.

Figure 3:
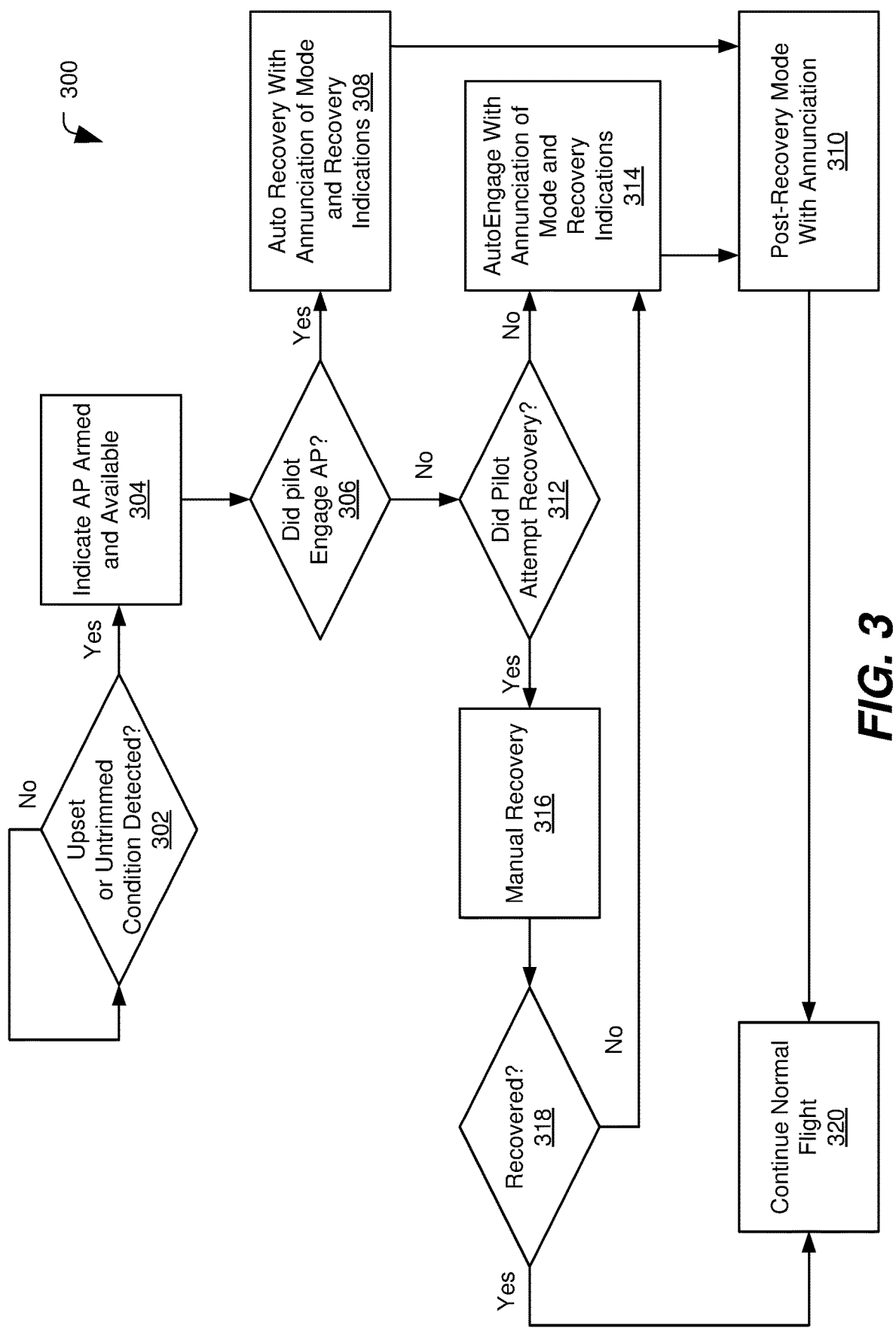
FIG. 3 is a flowchart of an example of operation of the autopilot system of FIG. 1 according to a particular aspect.

FIG. 3 is a flowchart of an example of operations 300 for the autopilot system of FIG. 1 according to a particular aspect. The operations 300 illustrated in FIG. 3 may be initiated, performed, or controlled by one or more processors executing instructions, such as by the processor(s) 130 of FIG. 1.

The operations 300 illustrated in FIG. 3 include, at block 302, determining whether an upset or untrimmed condition is detected. For example, the autopilot system 104 or another component of the aircraft 100 monitors the sensor data 122 to determine an operating condition of the aircraft 100. In this example, the upset or untrimmed condition is detected if the aircraft 100 is not operating in the first operating condition as described with reference to FIG. 1. For example, an upset condition is detected when: the aircraft 100 has a bank angle greater than one of the threshold(s) 150; the aircraft 100 has a positive pitch angle greater than one of the threshold(s) 150; the aircraft 100 has a negative pitch angle less than one of the threshold(s) 150; the aircraft 100 has a airspeed greater than one of the threshold(s) 150; the aircraft 100 has an airspeed less than one of the threshold(s) 150; or the aircraft 100 has another condition that fails to satisfy one of the threshold(s) 150 associated with normal operation of the aircraft 100. In this example, one or more of the threshold(s) can be dependent on the state of the aircraft 100. To illustrate, an airspeed threshold may be dependent on a current setting of the flaps of the aircraft 100. Further, in this example, one or more of the threshold(s) 150 may include a duration characteristic. To illustrate, an upset condition may be detected when one of the threshold(s) is exceeded for at least a specified duration (e.g., 5 seconds). In an example, an untrimmed condition is detected when pilot control input 120 indicates that the flight crew is struggling to maintain normal flight conditions. To illustrate, an untrimmed condition may be detected when the aircraft 100 is in a normal flight condition but the pilot control input 120 is extreme (e.g., greater than one of the threshold(s) 150) for the situation in terms of frequency, magnitude, or both.

If no upset or untrimmed condition is detected, the autopilot system 104 or other component of the aircraft 100 continues to monitor the sensor data 122. If an upset condition, an untrimmed condition, or both, are detected, the operations 300 continue to block 304 where the autopilot system 104 is armed and available and an indication that the autopilot system 104 is armed and available is provided to the pilot. For example, the indication that the autopilot system 104 is armed and available may be provided via the AP state indicator(s) 112 of FIG. 1.

At block 306, a determination is made whether the pilot engaged the autopilot system 104. For example, the pilot can engage the autopilot system 104 via the autopilot activation button(s) 116 of FIG. 1. If the pilot engaged the autopilot system 104, the operations 300 include, at block 308, automatically recovering the aircraft 100 to straight and level flight and providing annunciation to the pilot that the recovery system 134 is engaged and indicating the maneuvers (e.g., the planned maneuver(s) 114) that the autopilot system 104 will make to recover the aircraft 100. In a particular example, the autopilot system 104 applies the second control laws 142 while automatically recovering the aircraft 100. After recovery of the aircraft 100 is complete, at block 308, the operations include, at block 310, entering a post-recovery mode and providing annunciation to the pilot that the aircraft 100 is in post-recovery mode. For example, in the post-recovery mode the autopilot system 104 remains engaged, applies the first control laws 138, and operates the aircraft 100 based on settings selected by the AP settings selector 148. Normal flight continues, at block 320, after the aircraft 100 enters the post-recovery mode.

If the pilot did not engage the autopilot system 104 at block 306, the operations 300 include, at block 312, determining whether, during a period following detection of the upset or untrimmed condition, the pilot has attempted to recover the aircraft manually. If a specified duration expires without the pilot attempting to manually recover the aircraft 100, the operations 300 include, at block 314, automatically engaging the autopilot system 104 in a recovery mode (e.g., applying the second control laws 142) and providing annunciation to the pilot that the recovery system 134 is engaged and the maneuvers (e.g., the planned maneuver(s) 114) that the autopilot system 104 will make to recover the aircraft 100.

If pilot control input 120 is received indicating that the pilot is attempting to manually recover the aircraft 100 at block 312, the operations 300 include, at block 316, allowing the manual recovery to proceed for at least a specified period of time. After the specified period of time, the operations 300 include, at block 318, determining whether the pilot has successfully recovered the aircraft 100. If the pilot has successfully recovered the aircraft 100, the operations 300 continued to block 320. If the pilot has not successfully recovered the aircraft 100 during the specified period of time at block 318, the operations 300 include, at block 314, automatically engaging the autopilot system 104 in the recovery mode (e.g., applying the second control laws 142) and providing annunciation to the pilot that the recovery system 134 is engaged and the maneuvers (e.g., the planned maneuver(s) 114) that the autopilot system 104 will make to recover the aircraft 100.

At any of the decision blocks 302, 306, 312, 318 of FIG. 3, the time allowed for a decision can be dependent on the flight condition and state of the aircraft 100. To illustrate, if an upset or untrimmed condition is detected while the aircraft 100 is below a threshold altitude, the operations may proceed directly from block 302 to block 314 (e.g., a duration waited for the decisions of block 302, 306, and 312 is zero seconds, or as little time as is needed to initiate the recovery system 134 and apply the second control laws 142). As another example, if an upset or untrimmed condition is detected due to the aircraft 100 having a first pitch angle, the duration waited for one or more of the decisions of block 302, 306, and 312 is a first non-zero duration, and if an upset or untrimmed condition is detected due to the aircraft 100 having a second pitch angle, the duration waited for one or more of the decisions of block 302, 306, and 312 is a second non-zero duration, where the first non-zero duration is different from the second non-zero duration. For example, the second non-zero duration may be shorter than the first non-zero duration when the second pitch angle is steeper than the first pitch angle.

The operations 300 illustrated in FIG. 3 enable the autopilot system 104 to mitigate the risk of loss-of-control inflight events by enabling automatic recovery from upset and/or untrimmed conditions. The operations 300 also enable the autopilot system 104 to recover from conditions that the flight crew may be unaware of (e.g., due to lack of situational awareness or incapacity).

FIGS. 4-6 illustrate various examples of the pilot interface(s) 102 of the aircraft of FIG. 1. In particular, FIG. 4 illustrates an example of a mode control panel (MCP) 400. Additionally, FIG. 4 illustrates a first example of a primary flight display (PFD) 450A, FIG. 5 illustrates a second example of a PFD 450B, and FIG. 6 illustrates a third example of a PFD 450C.

The MCP 400 illustrates an example of information provided to a pilot when the autopilot system 104 of FIG. 1 is available to be engaged in a recovery mode. In the example illustrated in FIG. 4, the autopilot activation button 116 is located in the MCP 400. Additionally, the autopilot activation button 116 is illuminated as in indication of a state of the autopilot system 104. For example, the autopilot activation button 116 may be illuminated with a green light when the autopilot system 104 is engaged in a normal mode (e.g., is applying the first control laws 138). As another example, the autopilot activation button 116 may be illuminated with a different color light or with two or more different lights (e.g., a first color light 402 and a second color light 404) when the autopilot system 104 is available to be engaged in the recovery mode (e.g., to automatically recover the aircraft 100 by applying the second control laws 142). In this example, the pilot can use the same autopilot activation button 116 to engage the autopilot system 104 whether the aircraft 100 is operating in a normal flight condition, an untrimmed condition, or an upset condition; thus, simplifying pilot procedures and reducing pilot mental workload. In FIG. 4, the MCP 400 also includes other control input that the pilot can use to select autopilot settings, such as to select one or more armed or active autopilot modes, to display autopilot settings, to activate or deactivate a flight director, to disengage the autopilot system 104, etc.

The PFDs 450 of FIGS. 4-6 illustrate examples of information provided to a pilot when the autopilot system 104 is operating in the recovery mode. The PFDs 450 of FIGS. 4-6 include an airspeed indicator 452, an altitude indicator 454, and an attitude indicator 470, which includes a horizon line indicator 456. The PFDs 450 also include a flight mode annunciator 460. In FIGS. 4-6, the flight mode annunciator 460 includes text indicating that the auto-throttle (A/T) of an automatic recovery system (ARS) is active. In this example, the ARS includes, is included within, or corresponds to the autopilot system 104 of FIG. 1, which includes the recovery system 134, and the auto-throttle is part of the autopilot system 104. Additionally, the flight mode annunciator 460 includes text indicating that the autopilot system 104 is performing upset recovery operations. In the example illustrated in FIGS. 4-6, additional text 462 is provided to alert the pilot that the ARS is active.

The PFDs 450 of FIGS. 4-6 also include information to alert the pilot of one or more maneuvers that the autopilot system 104 plans to perform to recover the aircraft 100. For example, in each of FIGS. 4-6, the PFD 450 includes a speed bug 458 indicating a target airspeed that the autopilot system 104 plans to achieve. The PFDs 450 of FIGS. 4-6 illustrate different examples of displays to illustrate planned lateral and/or vertical maneuvering paths. In the example illustrated in FIG. 4, the PFD 450A includes lines 464 which represent planned future positions of the horizon line indicator 456. Thus, the lines 464 indicate to the pilot that the planned maneuvers include leveling the bank angle of the aircraft 100 and decreasing the pitch angle of the aircraft 100.

The PFD 450B of FIG. 5 reuses features of conventional flight director display elements to make the pilot aware of the maneuvers that the autopilot system 104 plans to perform. For example, the PFD 450B includes a horizontal flight director bar 472 and a vertical flight director bar 474. The horizontal flight director bar 472 indicates a vertical flight path direction, relative to the current aircraft attitude indicated by wing bars 476, that the autopilot system 104 plans to achieve. The vertical flight director bar 474 indicates a horizontal flight path direction that the autopilot system 104 plans to achieve.

The PFD 450C of FIG. 6 provides the same information as the PFD 450B as well as additional information. For example, in FIG. 6, the PFD 450C includes text 482 giving more detail about the upset condition. To illustrate, in FIG. 6, the upset condition is due to a high pitch angle and a high bank angle of the aircraft resulting in a low energy condition. The PFD 450C also includes an angle of attack indicator 486, which in the example illustrated in FIG. 6 includes an arrow indicating an angle of attack that the autopilot system 104 plans to achieve. The PFD 450C also includes a normal acceleration (Nz) indicator 484 indicating acceleration in the Earth-normal direction that the aircraft 100 will experience due to maneuvers performed by the autopilot system 104 to recover the aircraft 100.

Figure 7:
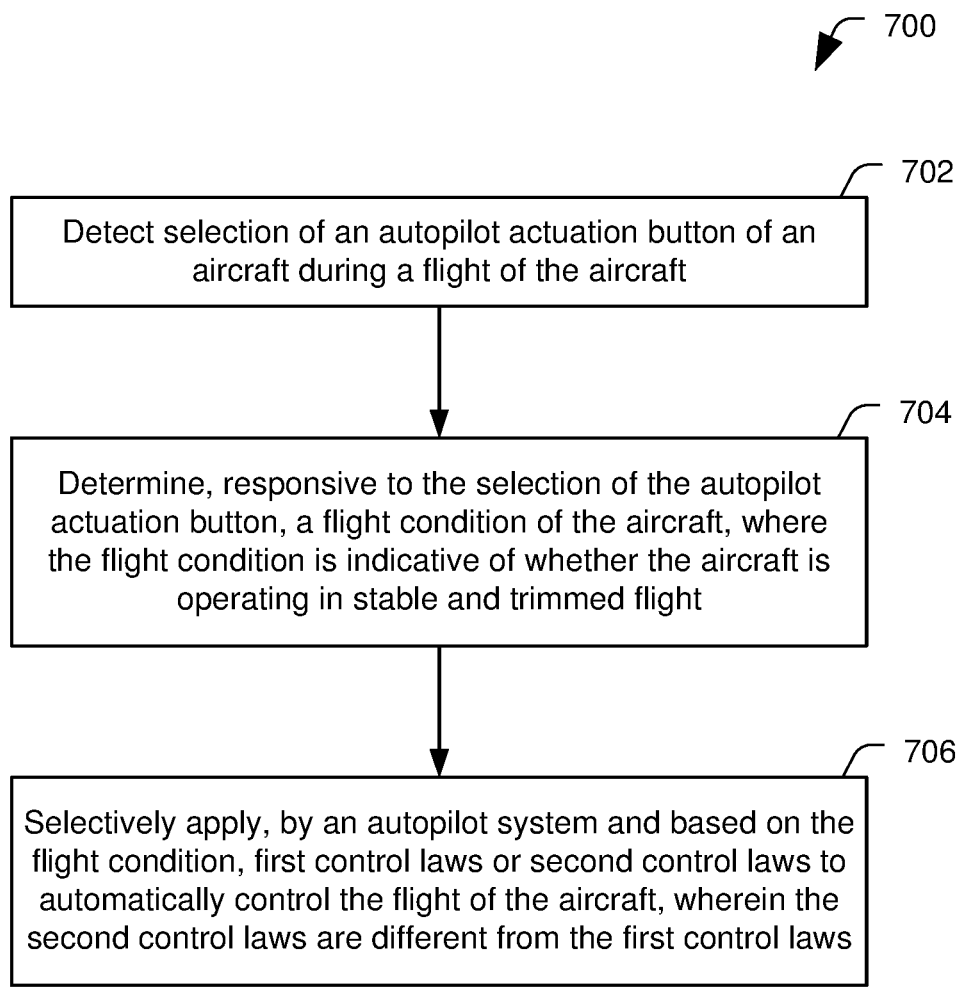
FIG. 7 is a flowchart of a method of selective application of control laws by the autopilot system of FIG. 1 according to a particular aspect.

FIG. 7 is a flowchart of a method 700 of selective application of control laws by the autopilot system of FIG. 1 according to a particular aspect. The method 700 may be initiated, performed, or controlled by one or more processors executing instructions from a memory, such as by the processor(s) 130 of the autopilot system 104 of FIG. 1.

The method 700 includes, at block 702, detecting selection of an autopilot activation button of an aircraft during a flight of the aircraft. For example, the autopilot system 104 may detect selection of the autopilot activation button(s) 116 by the pilot.

The method 700 includes, at block 704, determining, responsive to the selection of the autopilot activation button, a flight condition of the aircraft. The flight condition is indicative of whether the aircraft is operating in stable and trimmed flight. For example, the autopilot system 104 of FIG. 1 or another component of the aircraft 100 may determine whether the aircraft 100 is in stable and trimmed flight based on the sensor data 122.

The method 700 includes, at block 706, selectively applying, by an autopilot system and based on the flight condition, first control laws or second control laws to automatically control the flight of the aircraft, wherein the second control laws are different from the first control laws. For example, if the aircraft 100 is in stable and trimmed flight when the autopilot activation button 116 is selected, the autopilot system 104 activates and applies the first control laws 138. However, in this example, if the aircraft 100 is in an upset condition, an untrimmed condition, or both, when the autopilot activation button 116 is selected, the autopilot system 104 activates and applies the second control laws 142. In some implementations, while the second control laws 142 are applied, the method 700 includes generating one or more pilot information displays indicating one or more maneuvers that the autopilot system plans to perform.

In some implementations, the method 700 also includes selectively activating the autopilot system and applying the second control laws independent of pilot selection of the autopilot activation button. For example, the method 700 may include automatically engaging the autopilot system 104 in response to determining that the aircraft 100 is operating in a third condition, where the third condition represents a greater deviation from normal operation that the second condition. In this example, while the aircraft 100 is operating in the third condition, the second control laws 142 are applied to automatically control the flight of the aircraft 100 independently of selection of the autopilot activation button 116.

In some implementations, when the second control laws 142 are applied, the method 700 includes selecting, based on a flight condition of the aircraft 100, a force-disengage threshold from among a fixed threshold and a time-variable threshold. In such implementations, after the autopilot system 104 is engaged, the autopilot system 104 is disengaged in response to a pilot control input 120, via one or more pilot control devices 118, that exceeds the force-disengage threshold. In some such implementations, the force 160 required to exceed the force-disengage threshold is determined by the force-disengage selector 146 based, at least in part, on a time elapsed since the autopilot system 104 was automatically engaged.

In some implementations, while the second control laws 142 are applied, the method 700 includes determining a prior setpoint of a flight parameter for a period prior to a disturbance that led to the aircraft 100 operating in the flight condition and determining an updated setpoint of the flight parameter based at least in part on the prior setpoint of the flight parameter. For example, the AP settings selector 148 may perform a comparison of a current value of the flight parameter to the prior setpoint of the flight parameter. In this example, the updated setpoint is set equal to the prior setpoint based on a result of the comparison satisfying one or more return-to-setpoint criteria and the updated setpoint is set unequal to the prior setpoint based on the result of the comparison failing to satisfy the one or more return-to-setpoint criteria. In some implementations, the flight parameter includes a planned vertical path of the aircraft 100. In some such implementations, at least one of the one or more return-to-setpoint criteria is satisfied when a current vertical path of the aircraft 100 deviates by less than a threshold amount from the prior setpoint of the planned vertical path. In some such implementations, the updated setpoint is set equal to the prior setpoint further based on a result of the current vertical path satisfying a threshold. In some implementations, the flight parameter includes a planned lateral path of the aircraft 100. In some such implementations, at least one of the one or more return-to-setpoint criteria is satisfied when a current lateral path of the aircraft 100 deviates by less than a threshold amount from the prior setpoint of the planned lateral path. When the updated setpoint is set unequal to the prior setpoint, the updated setpoint is set to establish straight and level flight of the aircraft 100.

Figure 8:
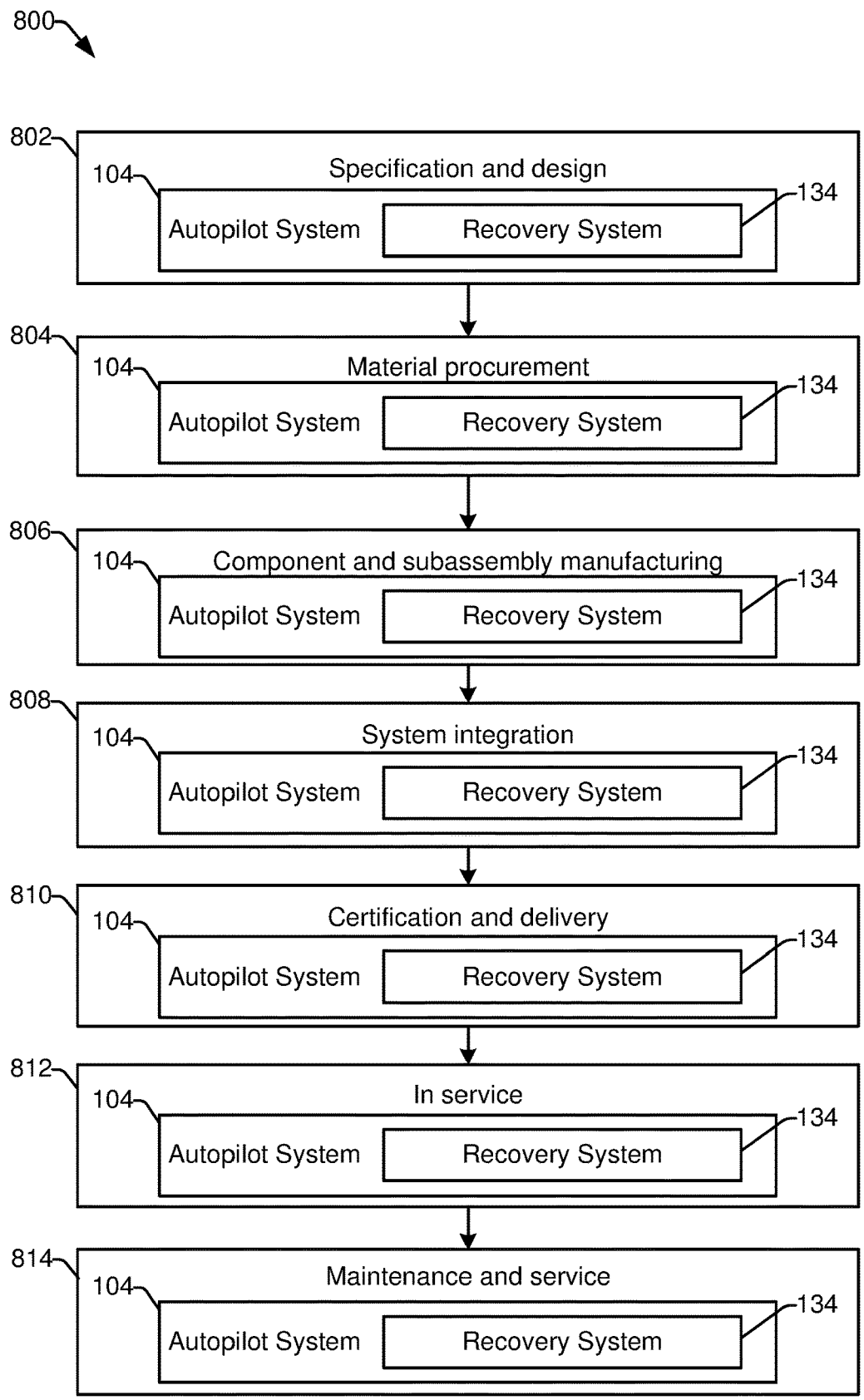
FIG. 8 is a flowchart illustrating an example of a life cycle of the aircraft of FIG. 1.

Referring to FIG. 8, a flowchart illustrative of a life cycle 800 of an aircraft that includes the autopilot system 104 with the recovery system 134 of FIG. 1. During pre-production, the exemplary life cycle 800 includes, at 802, specification and design of an aircraft, such as the aircraft 100 described with reference to FIG. 1 or FIG. 9. During specification and design of the aircraft, the life cycle 800 may include specification and design of the autopilot system 104, the recovery system 134, or both. At 804, the life cycle 800 includes material procurement, which may include procuring materials for the autopilot system 104, the recovery system 134, or both.

During production, the life cycle 800 includes, at 806, component and subassembly manufacturing and, at 808, system integration of the aircraft. For example, the life cycle 800 may include component and subassembly manufacturing of the autopilot system 104, the recovery system 134, or both, and system integration of the autopilot system 104, the recovery system 134, or both. At 810, the life cycle 800 includes certification and delivery of the aircraft and, at 812, placing the aircraft in service. Certification and delivery may include certification of the autopilot system 104, the recovery system 134, or both, to place the autopilot system 104, the recovery system 134, or both, in service. While in service by a customer, the aircraft may be scheduled for routine maintenance and service, which may also include modification, reconfiguration, refurbishment, and so on. At 814, the life cycle 800 includes performing maintenance and service on the aircraft, which may include performing maintenance and service on the autopilot system 104, the recovery system 134, or both. In a particular implementation, performing maintenance and service on the autopilot system 104 can include installing software (e.g., executable instructions) to add the recovery system 134 to the autopilot system 104.

Each of the stages or processes of the life cycle 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 9:
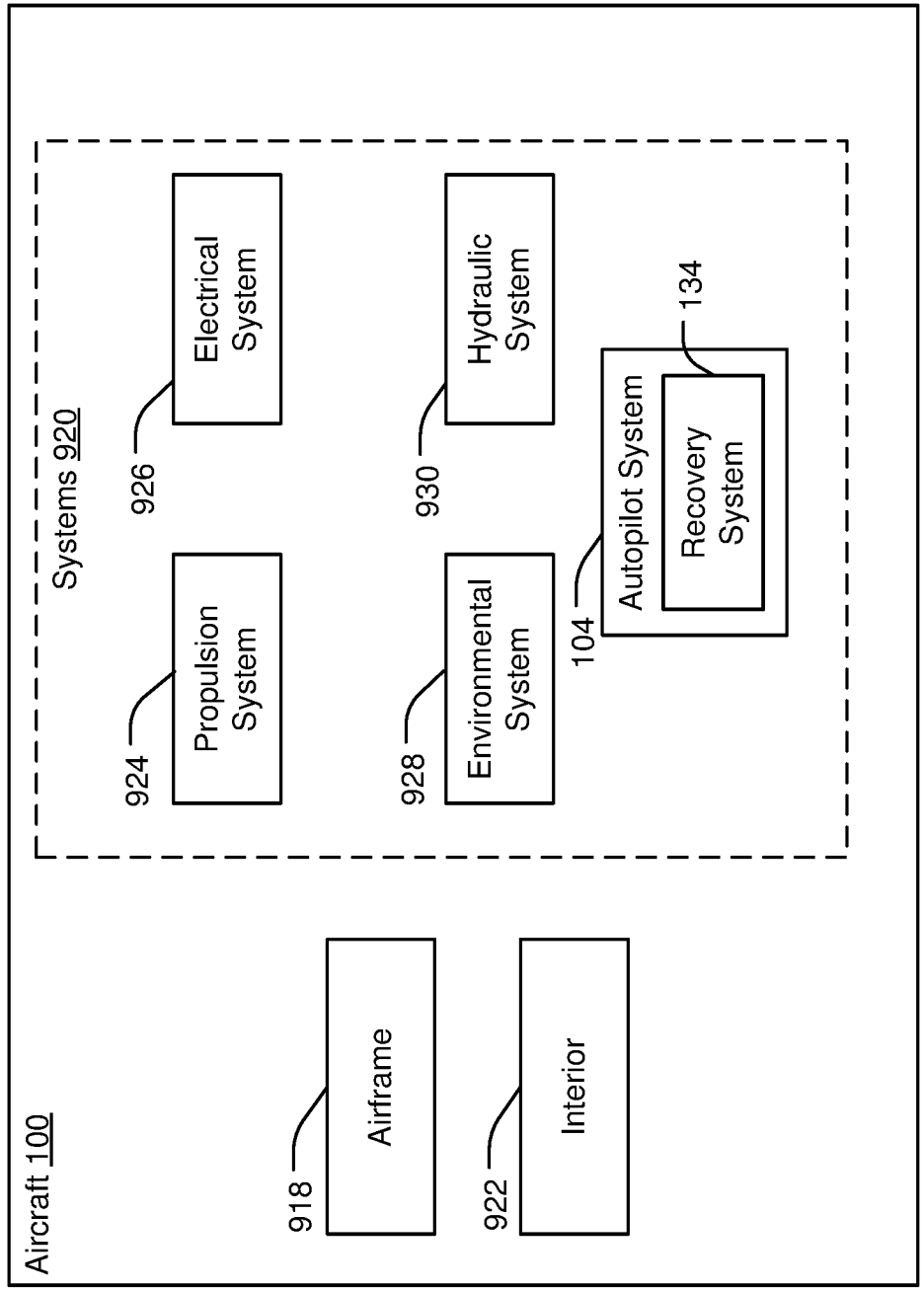
FIG. 9 is a block diagram of a particular implementation of the aircraft of FIG. 1.

Aspects of the disclosure can be described in the context of an example of an aircraft, such as the aircraft 100 of shown in FIG. 9. In the example of FIG. 9, the aircraft 100 includes an airframe 918 with a plurality of systems 920 and an interior 922. Examples of the plurality of systems 920 include one or more of a propulsion system 924, an electrical system 926, an environmental system 928, and a hydraulic system 930. In the example illustrated in FIG. 9, the systems 920 also include the autopilot system 104 with the recovery system 134. Any number of other systems may also be included in the aircraft 100.

Figure 10:
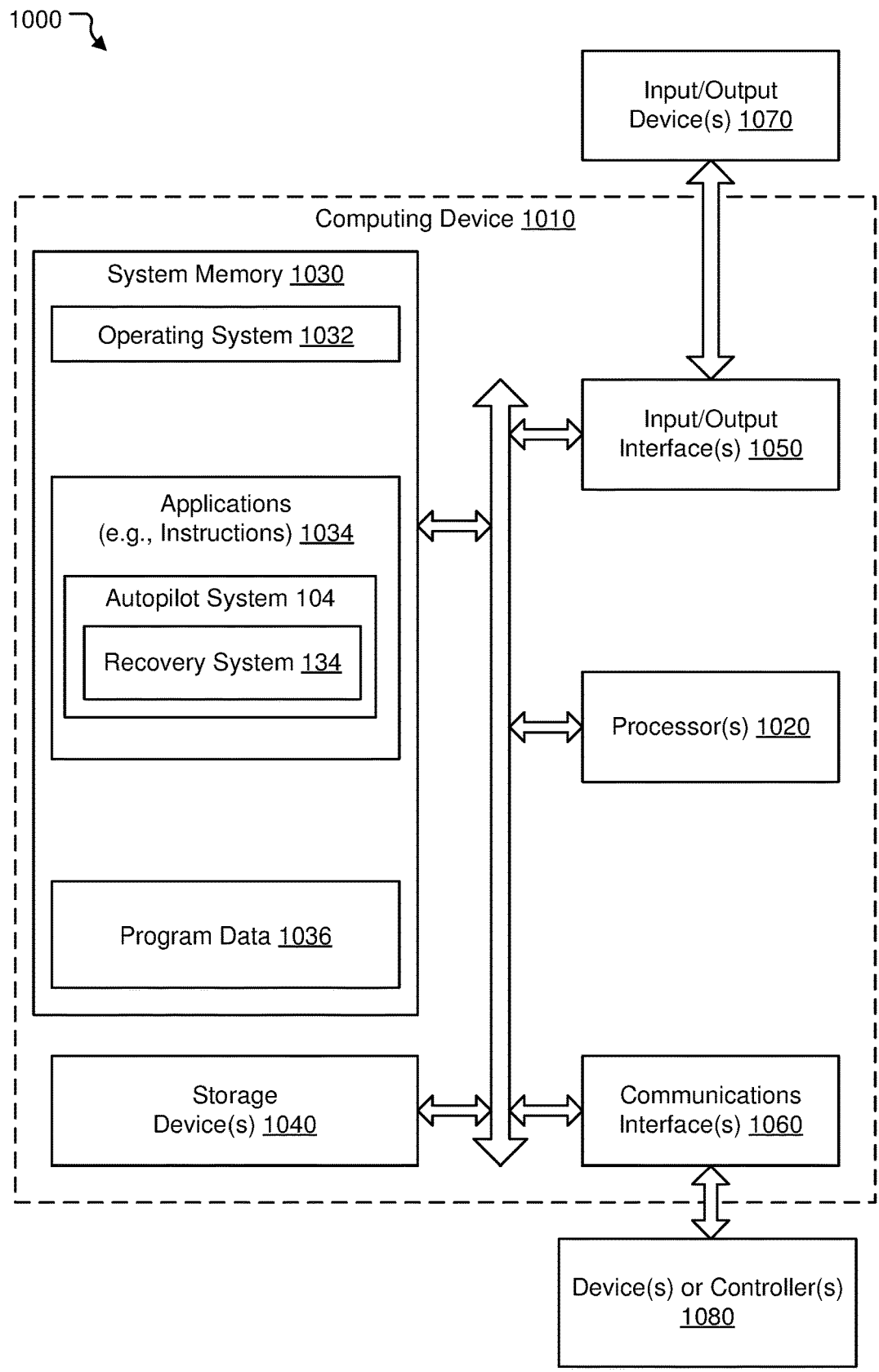
FIG. 10 is a block diagram of a computing environment including a computing device configured to support aspects of computer-implemented methods and computer-executable program instructions (or code) according to the present disclosure.

FIG. 10 is a block diagram of a computing environment 1000 including a computing device 1010 configured to support aspects of computer-implemented methods and computer-executable program instructions (or code) according to the present disclosure. For example, the computing device 1010, or portions thereof, is configured to execute instructions to initiate, perform, or control one or more operations described with reference to FIGS. 1-9. In a particular aspect, the computing device 1010 includes, is included within, or corresponds to one or more LRUs, such as one or more LRUs of the aircraft 100 of FIGS. 1 and 9.

The computing device 1010 includes one or more processors 1020. The processor(s) 1020 are configured to communicate with system memory 1030, one or more storage devices 1040, one or more input/output interfaces 1050, one or more communications interfaces 1060, or any combination thereof. In a particular implementation, the processor(s) 1020 correspond to the processor(s) 130 of FIG. 1 and the system memory 1030, the storage device(s) 1040, or both, correspond to the memory 132 of FIG. 1. The system memory 1030 includes volatile memory devices (e.g., random access memory (RAM) devices), nonvolatile memory devices (e.g., read-only memory (ROM) devices, programmable read-only memory, and flash memory), or both. The system memory 1030 stores an operating system 1032, which may include a basic input/output system for booting the computing device 1010 as well as a full operating system to enable the computing device 1010 to interact with users, other programs, and other devices. The system memory 1030 stores system (program) data 1036.

The system memory 1030 includes one or more applications 1034 (e.g., sets of instructions) executable by the processor(s) 1020. As an example, the one or more applications 1034 include instructions executable by the processor(s) 1020 to initiate, control, or perform one or more operations described with reference to FIGS. 1-9. To illustrate, the one or more applications 1034 include instructions executable by the processor(s) 1020 to initiate, control, or perform one or more operations described with reference to the autopilot system 104, the recovery system 134, or a combination thereof.

In a particular implementation, the system memory 1030 includes a non-transitory, computer readable medium storing the instructions that, when executed by the processor(s) 1020, cause the processor(s) 1020 to initiate, perform, or control operations to cause the autopilot system 104 to selectively apply control laws based on a flight condition of an aircraft.

The one or more storage devices 1040 include nonvolatile storage devices, such as magnetic disks, optical disks, or flash memory devices. In a particular example, the storage devices 1040 include both removable and non-removable memory devices. The storage devices 1040 are configured to store an operating system, images of operating systems, applications (e.g., one or more of the applications 1034), and program data (e.g., the program data 1036). In a particular aspect, the system memory 1030, the storage devices 1040, or both, include tangible computer-readable media. In a particular aspect, one or more of the storage devices 1040 are external to the computing device 1010.

The one or more input/output interfaces 1050 enable the computing device 1010 to communicate with one or more input/output devices 1070 to facilitate user interaction. For example, the one or more input/output interfaces 1050 can include a display interface, an input interface, or both. The input/output interface 1050 is adapted to receive input from a user, to receive input from another computing device, or a combination thereof. In some implementations, the input/output interface 1050 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1070 includes one or more user interface devices and displays, including some combination of buttons, keyboards, pointing devices, displays, speakers, microphones, touch screens, the pilot interface(s) 102 of FIG. 1, and other devices.

The processor(s) 1020 are configured to communicate with devices or controllers 1080 via the one or more communications interfaces 1060. For example, the one or more communications interfaces 1060 can include a network interface. The devices or controllers 1080 can include, for example, the sensor(s) 106 of FIG. 1, one or more other devices, or any combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-10. In some implementations, part or all of one or more of the operations or methods of FIGS. 1-10 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular Aspects of the Disclosure are Described Below in Sets of Interrelated Examples According to Example 1, an aircraft includes: an autopilot system including one or more processors configured to: in response to selection of an autopilot activation button during flight of the aircraft while the aircraft is operating in a first condition, apply first control laws to automatically control the flight of the aircraft; and in response to selection of the autopilot activation button while the aircraft is operating in a second condition, apply second control laws to automatically control the flight of the aircraft, wherein the second control laws are different from the first control laws.

Example 2 includes the aircraft of Example 1, further including one or more sensors coupled to the one or more processors, wherein the one or more processors are configured to determine an operating condition of the aircraft based, at least in part, on sensor data from the one or more sensors.

Example 3 includes the aircraft of Example 1 or Example 2, wherein the one or more processors are further configured to, while the aircraft is operating in a third condition, apply the second control laws to automatically control the flight of the aircraft independently of selection of the autopilot activation button.

Example 4 includes the aircraft of Example 3, wherein the one or more processors are further configured to automatically engage the autopilot system in response to determining that the aircraft is operating in the third condition.

Example 5 includes the aircraft of any of Examples 1 to 4, further including one or more pilot control devices, wherein the one or more processors are further configured to, after the autopilot system is engaged, disengage the autopilot system in response to a pilot control input, via the one or more pilot control devices, with a force that exceeds a force-disengage threshold, wherein the force required to exceed the force-disengage threshold is determined based, at least in part, on a time elapsed since the autopilot system was automatically engaged.

Example 6 includes the aircraft of Example 5, wherein the force required to exceed the force-disengage threshold is determined based, at least in part, on an operating condition of the aircraft.

Example 7 includes the aircraft of any of Examples 1 to 6, wherein the one or more processors are further configured to, while the second control laws are applied: determine a prior setpoint of a flight parameter for a period prior to a disturbance that led to the aircraft operating in the second condition; and determine an updated setpoint of the flight parameter based at least in part on the prior setpoint of the flight parameter.

Example 8 includes the aircraft of Example 7, wherein the one or more processors are further configured to perform a comparison of a current value of the flight parameter to the prior setpoint of the flight parameter, wherein the updated setpoint is set equal to the prior setpoint based on a result of the comparison satisfying one or more return-to-setpoint criteria, and wherein the updated setpoint is set unequal to the prior setpoint based on the result of the comparison failing to satisfy the one or more return-to-setpoint criteria.

Example 9 includes the aircraft of Example 8, wherein the flight parameter includes a planned vertical path of the aircraft, and wherein at least one of the one or more return-to-setpoint criteria is satisfied when a current vertical path of the aircraft deviates by less than a threshold amount from the prior setpoint of the planned vertical path.

Example 10 includes the aircraft of Example 9, wherein the updated setpoint is set equal to the prior setpoint further based on a result of the current vertical path satisfying a threshold.

Example 11 includes the aircraft of any of Examples 8 to 10, wherein the flight parameter includes a planned lateral path of the aircraft, and wherein at least one of the one or more return-to-setpoint criteria is satisfied when a current lateral path of the aircraft deviates by less than a threshold amount from the prior setpoint of the planned lateral path.

Example 12 includes the aircraft of any of Examples 8 to 11, wherein when the updated setpoint is set unequal to the prior setpoint, the updated setpoint is set to establish straight and level flight of the aircraft.

Example 13 includes the aircraft of any of Examples 1 to 12, wherein the one or more processors are further configured to, while the second control laws are applied, generate one or more pilot information displays indicating one or more maneuvers that the autopilot system plans to perform.

Example 14 includes the aircraft of Example 13, wherein the one or more pilot information displays further indicate that the autopilot system is engaged in a state associated with the second control laws.

Example 15 includes the aircraft of any of Examples 1 to 14, wherein the first control laws constrain operations of the aircraft to a first flight envelope, wherein the second control laws constrain operations of the aircraft to a second flight envelope, and wherein the first flight envelope is different from the second flight envelope.

Example 16 includes the aircraft of any of Examples 1 to 15, wherein the first condition is indicative of stable and trimmed flight, and wherein the second condition is indicative of unstable flight, untrimmed flight, or both.

According to Example 17, a method includes: detecting selection of an autopilot activation button of an aircraft during a flight of the aircraft; determining, responsive to the selection of the autopilot activation button, a flight condition of the aircraft, wherein the flight condition is indicative of whether the aircraft is operating in stable and trimmed flight; and selectively applying, by an autopilot system and based on the flight condition, first control laws or second control laws to automatically control the flight of the aircraft, wherein the second control laws are different from the first control laws.

Example 18 includes the method of Example 17, further including: selecting, based on the flight condition, a force-disengage threshold from among a fixed threshold and a time-variable threshold; and after the autopilot system is engaged, disengaging the autopilot system in response to a pilot control input, via one or more pilot control devices, that exceeds the force-disengage threshold.

Example 19 includes the method of Example 17 or Example 18, further including determining an operating condition of the aircraft based, at least in part, on sensor data from one or more sensors onboard the aircraft.

Example 20 includes the method of any of Examples 17 to 19, further including, while the aircraft is operating in a third condition, applying the second control laws to automatically control the flight of the aircraft independently of selection of the autopilot activation button.

Example 21 includes the method of Example 20, further including automatically engaging the autopilot system in response to determining that the aircraft is operating in the third condition.

Example 22 includes the method of any of Examples 17 to 21, further including, after the autopilot system is engaged, disengaging the autopilot system in response to a pilot control input, via one or more pilot control devices, with a force that exceeds a force-disengage threshold, wherein the force required to exceed the force-disengage threshold is determined based, at least in part, on a time elapsed since the autopilot system was automatically engaged.

Example 23 includes the method of Example 22, wherein the force required to exceed the force-disengage threshold is determined based, at least in part, on an operating condition of the aircraft.

Example 24 includes the method of any of Examples 17 to 23, further including, while the second control laws are applied: determining a prior setpoint of a flight parameter for a period prior to a disturbance that led to the aircraft operating in the flight condition; and determining an updated setpoint of the flight parameter based at least in part on the prior setpoint of the flight parameter.

Example 25 includes the method of Example 24, further including performing a comparison of a current value of the flight parameter to the prior setpoint of the flight parameter, wherein the updated setpoint is set equal to the prior setpoint based on a result of the comparison satisfying one or more return-to-setpoint criteria, and wherein the updated setpoint is set unequal to the prior setpoint based on the result of the comparison failing to satisfy the one or more return-to-setpoint criteria.

Example 26 includes the method of Example 25, wherein the flight parameter includes a planned vertical path of the aircraft, and wherein at least one of the one or more return-to-setpoint criteria is satisfied when a current vertical path of the aircraft deviates by less than a threshold amount from the prior setpoint of the planned vertical path.

Example 27 includes the method of Example 26, wherein the updated setpoint is set equal to the prior setpoint further based on a result of the current vertical path satisfying a threshold.

Example 28 includes the method of any of Examples 25 to 27, wherein the flight parameter includes a planned lateral path of the aircraft, and wherein at least one of the one or more return-to-setpoint criteria is satisfied when a current lateral path of the aircraft deviates by less than a threshold amount from the prior setpoint of the planned lateral path.

Example 29 includes the method of any of Examples 25 to 28, wherein when the updated setpoint is set unequal to the prior setpoint, the updated setpoint is set to establish straight and level flight of the aircraft.

Example 30 includes the method of any of Examples 17 to 29, further including, while the second control laws are applied, generating one or more pilot information displays indicating one or more maneuvers that the autopilot system plans to perform.

Example 31 includes the method of Example 30, wherein the one or more pilot information displays further indicate that the autopilot system is engaged in a state associated with the second control laws.

Example 32 includes the method of any of Examples 17 to 31, wherein the first control laws constrain operations of the aircraft to a first flight envelope, wherein the second control laws constrain operations of the aircraft to a second flight envelope, wherein the first flight envelope is different from the second flight envelope.

According to Example 33, a device includes: a memory configured to store instructions; and a processor configured to execute the instructions to perform the method of any of Examples 17 to 32.

According to Example 34, a non-transitory computer-readable medium stores instructions that, when executed by a processor, cause the processor to perform the method of any of Examples 17 to Example 32.

According to Example 35, an apparatus includes means for carrying out the method of any of Examples 17 to Example 32.

According to Example 36, a non-transitory computer-readable medium includes instructions that are executable by one or more processors to cause the one or more processors to: based on selection of an autopilot activation button of an aircraft during a flight of the aircraft, determine a flight condition of the aircraft, wherein the flight condition is indicative of whether the aircraft is operating in stable and trimmed flight; and engage an autopilot system to selectively apply, based on the flight condition, first control laws or second control laws to automatically control the flight of the aircraft, wherein the second control laws are different from the first control laws.

Example 37 includes the non-transitory computer-readable medium of Example 36, wherein the instructions are further executable by the one or more processors to cause the autopilot system to: apply the second control laws when the flight condition is indicative of unstable flight, untrimmed flight, or both; and generate one or more pilot information displays that indicate one or more maneuvers that the autopilot system plans to perform to return the aircraft to stable and trimmed flight.

Example 38 includes the non-transitory computer-readable medium of Example 36 or Example 37, wherein the instructions are further executable by the one or more processors to determine an operating condition of the aircraft based, at least in part, on sensor data from one or more sensors onboard the aircraft.

Example 39 includes the non-transitory computer-readable medium of any of Examples 36 to 38, wherein the instructions are further executable by the one or more processors to, while the aircraft is operating in a third condition, apply the second control laws to automatically control the flight of the aircraft independently of selection of the autopilot activation button.

Example 40 includes the non-transitory computer-readable medium of Example 39, wherein the instructions are further executable by the one or more processors to automatically engage the autopilot system in response to determining that the aircraft is operating in the third condition.

Example 41 includes the non-transitory computer-readable medium of any of Examples 36 to 40, wherein the instructions are further executable by the one or more processors to, after the autopilot system is engaged, disengage the autopilot system in response to a pilot control input, via one or more pilot control devices, with a force that exceeds a force-disengage threshold, and wherein the force required to exceed the force-disengage threshold is determined based, at least in part, on a time elapsed since the autopilot system was automatically engaged.

Example 42 includes the non-transitory computer-readable medium of Example 41, wherein the force required to exceed the force-disengage threshold is determined based, at least in part, on an operating condition of the aircraft.

Example 43 includes the non-transitory computer-readable medium of any of Examples 36 to 42, wherein the instructions are further executable by the one or more processors to, while the second control laws are applied: determine a prior setpoint of a flight parameter for a period prior to a disturbance that led to the aircraft operating in the flight condition; and determine an updated setpoint of the flight parameter based at least in part on the prior setpoint of the flight parameter.

Example 44 includes the non-transitory computer-readable medium of Example 43, wherein the instructions are further executable by the one or more processors to perform a comparison of a current value of the flight parameter to the prior setpoint of the flight parameter, wherein the updated setpoint is set equal to the prior setpoint based on a result of the comparison satisfying one or more return-to-setpoint criteria, and wherein the updated setpoint is set unequal to the prior setpoint based on the result of the comparison failing to satisfy the one or more return-to-setpoint criteria.

Example 45 includes the non-transitory computer-readable medium of Example 44, wherein the flight parameter includes a planned vertical path of the aircraft, and wherein at least one of the one or more return-to-setpoint criteria is satisfied when a current vertical path of the aircraft deviates by less than a threshold amount from the prior setpoint of the planned vertical path.

Example 46 includes the non-transitory computer-readable medium of Example 45, wherein the updated setpoint is set equal to the prior setpoint further based on a result of the current vertical path satisfying a threshold.

Example 47 includes the non-transitory computer-readable medium of any of Examples 44 to 46, wherein the flight parameter includes a planned lateral path of the aircraft, and wherein at least one of the one or more return-to-setpoint criteria is satisfied when a current lateral path of the aircraft deviates by less than a threshold amount from the prior setpoint of the planned lateral path.

Example 48 includes the non-transitory computer-readable medium of any of Examples 44 to 47, wherein, when the updated setpoint is set unequal to the prior setpoint, the updated setpoint is set to establish straight and level flight of the aircraft.

Example 49 includes the non-transitory computer-readable medium of any of Examples 36 to 48, wherein the instructions are further executable by the one or more processors to, while the second control laws are applied, generate one or more pilot information displays indicating one or more maneuvers that the autopilot system plans to perform.

Example 50 includes the non-transitory computer-readable medium of Example 49, wherein the one or more pilot information displays further indicate that the autopilot system is engaged in a state associated with the second control laws.

Example 51 includes the non-transitory computer-readable medium of any of Examples 36 to 50, wherein the first control laws constrain operations of the aircraft to a first flight envelope, wherein the second control laws constrain operations of the aircraft to a second flight envelope, and wherein the first flight envelope is different from the second flight envelope.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
an autopilot system including one or more processors configured to:
in response to selection of an autopilot activation button during flight of the aircraft while the aircraft is operating in a first condition, apply first control laws to automatically control the flight of the aircraft;
in response to selection of the autopilot activation button while the aircraft is operating in a second condition, apply second control laws to automatically control the flight of the aircraft, wherein the second control laws are different from the first control laws; and
while the second control laws are applied:
determine a prior setpoint of a flight parameter for a period prior to a disturbance that led to the aircraft operating in the second condition; and
determine an updated setpoint of the flight parameter based, at least in part, on the prior setpoint of the flight parameter.

2. The aircraft of claim 1, further comprising one or more sensors coupled to the one or more processors, wherein the one or more processors are configured to determine an operating condition of the aircraft based, at least in part, on sensor data from the one or more sensors.

3. The aircraft of claim 1, wherein the one or more processors are further configured to, while the aircraft is operating in a third condition, apply the second control laws to automatically control the flight of the aircraft independently of selection of the autopilot activation button.

4. The aircraft of claim 3, wherein the one or more processors are further configured to automatically engage the autopilot system in response to determining that the aircraft is operating in the third condition.

5. The aircraft of claim 1, further comprising one or more pilot control devices, wherein the one or more processors are further configured to, after the autopilot system is engaged, disengage the autopilot system in response to a pilot control input, via the one or more pilot control devices, with a force that exceeds a force-disengage threshold, and wherein the force required to exceed the force-disengage threshold is determined based, at least in part, on a time elapsed since the autopilot system was automatically engaged.

6. The aircraft of claim 5, wherein the force required to exceed the force-disengage threshold is determined based, at least in part, on an operating condition of the aircraft.

7. The aircraft of claim 1, wherein the one or more processors are further configured to perform a comparison of a current value of the flight parameter to the prior setpoint of the flight parameter, wherein the updated setpoint is set equal to the prior setpoint based on a result of the comparison satisfying one or more return-to-setpoint criteria, and wherein the updated setpoint is set unequal to the prior setpoint based on the result of the comparison failing to satisfy the one or more return-to-setpoint criteria.

8. The aircraft of claim 7, wherein the flight parameter includes a planned vertical path of the aircraft, and wherein at least one of the one or more return-to-setpoint criteria is satisfied when a current vertical path of the aircraft deviates by less than a threshold amount from the prior setpoint of the planned vertical path.

9. The aircraft of claim 8, wherein the updated setpoint is set equal to the prior setpoint further based on a result of the current vertical path satisfying a threshold.

10. The aircraft of claim 7, wherein the flight parameter includes a planned lateral path of the aircraft, and wherein at least one of the one or more return-to-setpoint criteria is satisfied when a current lateral path of the aircraft deviates by less than a threshold amount from the prior setpoint of the planned lateral path.

11. The aircraft of claim 7, wherein when the updated setpoint is set unequal to the prior setpoint, the updated setpoint is set to establish straight and level flight of the aircraft.

12. The aircraft of claim 1, wherein the one or more processors are further configured to, while the second control laws are applied, generate one or more pilot information displays indicating one or more maneuvers that the autopilot system plans to perform.

13. The aircraft of claim 12, wherein the one or more pilot information displays further indicate that the autopilot system is engaged in a state associated with the second control laws.

14. The aircraft of claim 1, wherein the first control laws constrain operations of the aircraft to a first flight envelope, wherein the second control laws constrain operations of the aircraft to a second flight envelope, and wherein the first flight envelope is different from the second flight envelope.

15. The aircraft of claim 1, wherein the first condition is indicative of stable and trimmed flight, and wherein the second condition is indicative of unstable flight, untrimmed flight, or both.

16. A method comprising:
- detecting selection of an autopilot activation button of an aircraft during a flight of the aircraft;
- determining, responsive to the selection of the autopilot activation button, a flight condition of the aircraft, wherein the flight condition is indicative of whether the aircraft is operating in stable and trimmed flight;
- selectively applying, by an autopilot system and based on the flight condition, first control laws or second control laws to automatically control the flight of the aircraft, wherein the second control laws are different from the first control laws; and
- while the second control laws are applied:
    - determining a prior setpoint of a flight parameter for a period prior to a disturbance that led to the aircraft operating in the flight condition; and
    - determining an updated setpoint of the flight parameter based, at least in part, on the prior setpoint of the flight parameter.

17. The method of claim 16, wherein the first control laws constrain operations of the aircraft to a first flight envelope, wherein the second control laws constrain operations of the aircraft to a second flight envelope, and wherein the first flight envelope is different from the second flight envelope.

18. The method of claim 16, further comprising automatically engaging the autopilot system in response to determining that the aircraft is operating in an upset condition, an untrimmed condition, or both.

19. The method of claim 16, further comprising, after the autopilot system is activated, determining, based on a time elapsed since the autopilot system was activated, a force-disengage threshold indicating a force required to be applied to a pilot control input to disengage the autopilot system.

20. A non-transitory computer-readable medium comprising instructions that are executable by one or more processors to cause the one or more processors to:
- based on selection of an autopilot activation button of an aircraft during a flight of the aircraft, determine a flight condition of the aircraft, wherein the flight condition is indicative of whether the aircraft is operating in stable and trimmed flight;
- engage an autopilot system to selectively apply, based on the flight condition, first control laws or second control laws to automatically control the flight of the aircraft, wherein the second control laws are different from the first control laws; and
- while the second control laws are applied:
    - determine a prior setpoint of a flight parameter for a period prior to a disturbance that led to the aircraft operating in the flight condition; and
    - determine an updated setpoint of the flight parameter based, at least in part, on the prior setpoint of the flight parameter.

* * * * *